(12) United States Patent
Suzuki

(10) Patent No.: US 11,773,981 B2
(45) Date of Patent: Oct. 3, 2023

(54) SEALING DEVICE

(71) Applicant: NOK CORPORATION, Tokyo (JP)

(72) Inventor: Atsushi Suzuki, Fukushima (JP)

(73) Assignee: NOK CORPORATION, Tokyo (JP)

(*) Notice: Subject to any disclaimer, the term of this patent is extended or adjusted under 35 U.S.C. 154(b) by 55 days.

(21) Appl. No.: 17/607,150

(22) PCT Filed: Apr. 24, 2020

(86) PCT No.: PCT/JP2020/017590
§ 371 (c)(1),
(2) Date: Oct. 28, 2021

(87) PCT Pub. No.: WO2020/250577
PCT Pub. Date: Dec. 17, 2020

(65) Prior Publication Data
US 2022/0178447 A1  Jun. 9, 2022

(30) Foreign Application Priority Data

Jun. 12, 2019 (JP) .............................. 2019-109194

(51) Int. Cl.
*F16J 15/3224* (2016.01)
*F16J 15/3232* (2016.01)
(Continued)

(52) U.S. Cl.
CPC ......... *F16J 15/3224* (2013.01); *F16J 15/324* (2013.01); *F16J 15/3232* (2013.01); *F16J 15/52* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS

2005/0250586 A1* 11/2005 Yamada ............... F16J 15/3224
464/170
2010/0133758 A1 6/2010 Kanzaki et al.
(Continued)

FOREIGN PATENT DOCUMENTS

JP   S53-55054 U   5/1978
JP   2008-32208 A  2/2008
(Continued)

OTHER PUBLICATIONS

Rubber properties (Year: 2002).*
(Continued)

*Primary Examiner* — Nathan Cumar
(74) *Attorney, Agent, or Firm* — GREENBLUM & BERNSTEIN, P.L.C.

(57) ABSTRACT

A sealing device includes a mounted part to be mounted to the inner peripheral surface of the shaft hole, a cylindrical part disposed radially inside the mounted part, a seal lip portion extending from the cylindrical part and in contact with the outer peripheral surface of the rotational shaft, a bellows part connecting the mounted part and the cylindrical part, and an annular sliding member made of a resin and disposed radially inside the cylindrical part, the outer peripheral surface of the rotational shaft being slidable on the annular sliding member.

13 Claims, 9 Drawing Sheets

(51) Int. Cl.
*F16J 15/324* (2016.01)
*F16J 15/52* (2006.01)

(58) Field of Classification Search
CPC .... F16J 15/3208; F16J 15/3216; F16J 15/324; F16J 15/525; F16J 15/54
USPC .......................................................... 277/561
See application file for complete search history.

(56) References Cited

U.S. PATENT DOCUMENTS

| | | | |
|---|---|---|---|
| 2017/0219100 A1 | | 8/2017 | Kobayashi et al. |
| 2017/0234434 A1* | | 8/2017 | Shuto .................... F16J 3/04 |
| | | | 277/504 |

FOREIGN PATENT DOCUMENTS

| | | | |
|---|---|---|---|
| JP | 2010-91077 A | | 4/2010 |
| JP | 2016-20721 A | | 2/2016 |
| JP | 2018-16149 A | | 2/2018 |
| JP | 2018016149 A | * | 2/2018 |
| WO | WO 2010/041543 A1 | | 4/2010 |
| WO | WO 2016/076087 A1 | | 5/2016 |
| WO | WO 2016/076186 A1 | | 5/2016 |

OTHER PUBLICATIONS

PTFE and Filled PTFE characteristics.*
ISR for PCT/JP2020/017590, dated Jul. 7, 2020.
Notice of Reasons for Refusal received in JP Application No. 2021-525932, dated Sep. 27, 2022.

* cited by examiner

SEALING DEVICE

TECHNICAL FIELD

The present invention relates to sealing devices suitable for use as steering dust seals.

A steering dust seal is disposed on a front dash panel, and a steering shaft is rotatably inserted into the steering dust seal (Patent Document 1).

The steering dust seal has a function of reducing ingress of foreign matter (dust, muddy water, etc.) from the engine compartment into the passenger compartment, and of reducing transmission of sound from the engine compartment into the passenger compartment.

A steering dust seal disclosed in Patent Document 1 has a bellows part made of an elastic material, a cylindrical part made of an elastic material disposed inside the bellows part, and a low-friction sliding ring disposed inside the cylindrical part.

The low-friction sliding ring is arranged around the steering shaft so as to be in slidable contact with the outer peripheral surface of the steering shaft. The low-friction sliding ring is formed of a resin with a low coefficient of friction to restrict generation of abnormal noise when the steering shaft rotates.

BACKGROUND DOCUMENTS

Patent Documents

Patent Document 1: JP-A-2010-91077

SUMMARY OF THE INVENTION

A lip in slidable contact with the steering shaft is formed in the cylindrical part disposed around the low-friction sliding ring, and the lip restricts the ingress of foreign matter from the engine compartment into the passenger compartment. For the lip to stably contact the outer peripheral surface of the steering shaft over the entire circumference, it is desirable that the low-friction sliding ring with high rigidity be stably and reliably connected with the cylindrical part made of an elastic material. For example, even if the steering shaft is eccentric relative to the housing, it is desired that the lip continue to be in contact with the outer peripheral surface of the steering shaft over the entire circumference. Furthermore, in a case in which the steering shaft is provided in a tilt steering mechanism, it is desirable that the lip continue to be in contact with the outer peripheral surface of the steering shaft over the entire circumference even if the steering shaft is tilted.

Accordingly, the present invention provides a sealing device for stabilizing a secure connection between an annular sliding member and a cylindrical part made of an elastic material.

A sealing device according to the present invention is a sealing device for sealing a clearance between a housing and a rotational shaft disposed in a housing. The sealing device includes an annular mounted part being to be mounted to an inner peripheral surface of the shaft hole: a cylindrical part disposed radially inside the mounted part; a seal lip portion extending from the cylindrical part and being to be in contact with an outer peripheral surface of the rotational shaft; a bellows part connecting the mounted part to the cylindrical part; and an annular sliding member made of a resin and disposed radially inside the cylindrical part, the outer peripheral surface of the rotational shaft being to slide on the annular sliding member. The cylindrical part, the seal lip portion, and the bellows part are made of an elastic material having an elasticity that is higher than that of the resin. The cylindrical part includes a projecting portion projecting radially inward, the projecting portion being an annular projection extending continuously in a circumferential direction, or including a plurality of projections arranged at intervals in a circumferential direction. The projecting portion includes two surfaces perpendicular to the rotational shaft. A circumferential groove is formed on an outer peripheral surface of the sliding member, the circumferential groove including a cylindrical bottom peripheral surface and two side walls perpendicular to the bottom peripheral surface. The projecting portion is fitted into the circumferential groove, with the two surfaces of the projecting portion being in contact with the two side wall surfaces of the circumferential groove, respectively.

In this aspect, the projecting portion of the cylindrical part made of an elastic material projecting radially inward is fitted into the circumferential groove on the outer peripheral surface of the sliding member. Since the two surfaces of the projecting portion are respectively in contact with the two side wall surfaces of the circumferential groove, the sliding member is securely connected with the cylindrical part, and the connection is stabilized. Therefore, even if the rotational shaft (steering shaft) is eccentric or inclined relative to the housing, the seal lip portion continues to be in contact with the outer peripheral surface of the rotational shaft over the entire circumference.

DESCRIPTION OF EMBODIMENTS

Hereinafter, with reference to the accompanying drawings, various embodiments according to the present invention will be described. It is of note that the drawings are not necessarily to scale, and certain features may be exaggerated or omitted.

First Embodiment

Figure 1:
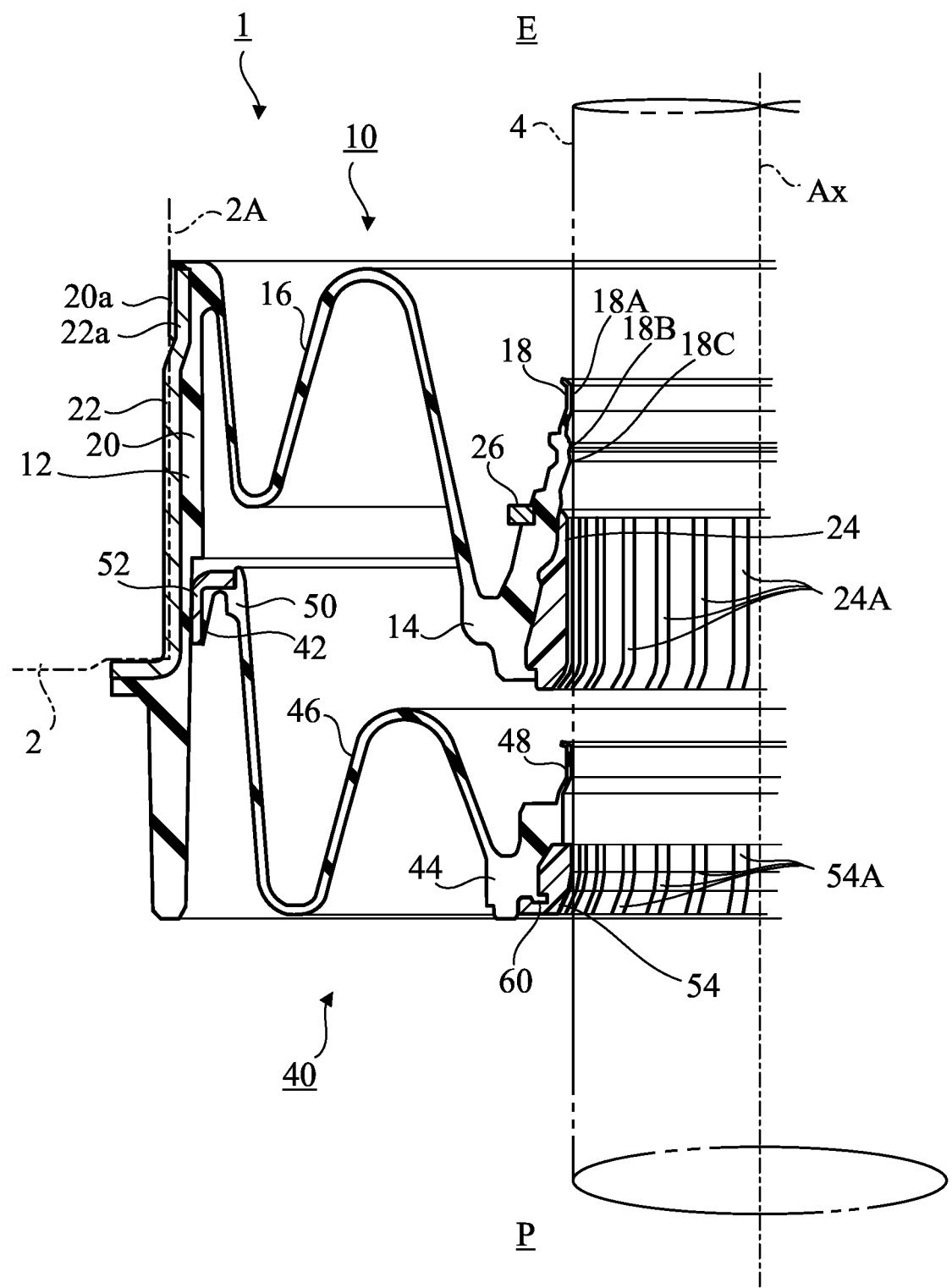
FIG. 1 is a cross-sectional view showing a sealing device according to a first embodiment of the present invention.

As shown in FIG. 1, a sealing device 1 according to a first embodiment of the present invention is a steering dust seal for sealing a clearance between a housing (front dash panel) 2 and a rotational shaft (steering shaft) 4 disposed in a shaft hole 2A provided in the housing 2. The rotational shaft 4 is rotated about an axis Ax. The sealing device 1 is an annular component, the left half of which is shown in FIG. 1. In FIG. 1, symbol E indicates a space on the engine compartment side, whereas symbol P indicates a space on the passenger compartment side.

The sealing device 1 has two sealing parts 10 and 40, which have structures similar to each other.

The sealing part 10 basically is a high elastic component made of an elastic material, e.g., an elastomer, and includes an annular mounted part 12 that is to be mounted to the inner peripheral surface of the shaft hole 2A, a cylindrical part 14 disposed radially inside the mounted part 12, and a folded bellows part 16 connecting the mounted part 12 with the cylindrical part 14.

Furthermore, the sealing part 10 includes a seal lip portion 18 extending radially inward from the cylindrical part 14 and toward the space E on the engine compartment side. The seal lip portion 18 is for being in contact with the outer peripheral surface of the rotational shaft 4 over the entire circumference. The seal lip portion 18 has multiple seal lips 18A, 18B, and 18C, which are in slidable contact with the rotational shaft 4. The seal lips 18A, 18B, and 18C are elastically deformed since they are in contact with the rotational shaft 4. The cylindrical part 14, the bellows part 16, and the seal lip portion 18 are formed of an elastic material, for example, an elastomer.

In this embodiment, three sealing lips 18A, 18B, and 18C are provided, but the three sealing lips 18A, 18B, and 18C do not necessarily have to be in contact with the rotational shaft 4 at the same time, and at least one sealing lip should be in contact with the rotational shaft 4 at any point in time. The number of seal lips is not limited to the embodiment, and may be one, two, or four or more.

The mounted part 12 includes an elastic ring 20 made of an elastic material, e.g., an elastomer, and a rigid ring 22 made of a rigid material, e.g., a metal, fixed around the elastic ring 20. The elastic ring 20 may be formed of the same material as that of the cylindrical part 14, the bellows part 16, and the sealing lip portion 18, and in this case, the elastic ring 20 is connected to the bellows part 16.

The rigid ring 22 is engaged (press fit) into the shaft hole 2A. In the rigid ring 22, one end 22a has a smaller diameter than other portions, and a portion 20a of the elastic ring 20 is disposed around the entire circumference of the end 22a. The portion 20a is compressed between the end 22a of the rigid ring 22 and the housing 2 for sealing the clearance between the mounted part 12 and the housing 2.

The rotational shaft 4 is a steering shaft provided in a tilt steering mechanism. Therefore, the rotational shaft 4 is inclined by the driver. In addition, the rotational shaft 4 can be eccentric relative to the shaft hole 2A. The bellows part 16 is a part that is easily elastically deformed, and is provided so as to allow the movement, i.e., the inclination and eccentricity of the rotational shaft 4 by means of the elastic deformation thereof, and to allow the seal lips 18A, 18B, and 18C to be in contact with the outer peripheral surface of the rotational shaft 4 over the entire circumference.

Furthermore, the sealing part 10 includes an annular sliding member 24 that is disposed inside the cylindrical part 14 and is fixed to the cylindrical part 14. The sliding member 24 may be fixed to the cylindrical part 14 by, for example, engaging a convex portion formed on the outer peripheral surface of the sliding member 24 into a recess formed on the inner peripheral surface of the cylindrical part 14. However, the scheme for fixing the sliding member 24 to the cylindrical part 14 is not limited.

The sliding member 24 is provided so that the seal lips 18A, 18B, and 18C can be in contact with the outer peripheral surface of the rotational shaft 4 over the entire circumference even when the rotational shaft 4 is inclined or eccentric relative to the shaft hole 2A. When the rotational shaft 4 is inclined or eccentric relative to the shaft hole 2A, the sliding member 24 around the rotational shaft 4 is moved following the movement of the rotational shaft 4. Since the seal lips 18A, 18B, and 18C are located in stationary positions relative to the sliding member 24, they are also located in stationary positions relative to the rotational shaft 4. Therefore, the seal lips 18A, 18B, and 18C can be in contact with the outer peripheral surface of the rotational shaft 4 over the entire circumference.

Thus, when the rotational shaft 4 is rotated, the outer peripheral surface of the rotational shaft 4 slides on the inner peripheral surface of the sliding member 24. The sliding member 24 is made of a resin having a lower coefficient of friction, such as polytetrafluoroethylene that is harder than elastomers. Therefore, even when the rotational shaft 4 is rotated, abnormal noise, which may be caused by friction between the outer peripheral surface of the rotational shaft 4 and the inner peripheral surface of the sliding member 24, is prevented from being generated.

Although not necessary, grooves 24A for retaining grease are formed on the inner peripheral surface of the sliding member 24. The grease further reduces the friction between the outer peripheral surface of the rotational shaft 4 and the inner peripheral surface of the sliding member 24.

Although not necessary, the sealing part 10 includes a reinforcing ring 26 embedded in the cylindrical part 14. The reinforcing ring 26 is made of a rigid material, for example, a metal, and reduces the deformation of the cylindrical part 14 so that each of the seal lips 18A, 18B, and 18C can be in contact with the rotational shaft 4 in a stable orientation.

The sealing part 40 has a structure similar to that of the sealing part 10. The dual structure having the sealing parts 10 and 40 further improves the function of reducing transmission of sound from the space E on the engine compartment side to the space P on the passenger compartment side, and further improves the function of reducing ingress of foreign matter from the space E on the engine compartment side to the space P on the passenger compartment side.

The sealing part 40 also basically a high elastic component made of an elastic material, e.g., an elastomer, and includes an annular mounted part 42 that is to be mounted to the inner peripheral surface of the shaft hole 2A, a cylindrical part 44 disposed radially inside the mounted part 42, and a folded bellows part 46 connecting the mounted part 42 with the cylindrical part 44.

Furthermore, the sealing part 40 includes a seal lip portion 48 extending radially inward from the cylindrical part 14 and toward the space E on the engine compartment side. The seal lip portion 48 is for being in contact with the outer peripheral surface of the rotational shaft 4 over the entire circumference. The seal lip portion 48 has a cylindrical shape, which is in slidable surface contact with the rotational shaft 4. The seal lip portion 48 is elastically deformed since it is in contact with the rotational shaft 4. The cylindrical part 44, the bellows part 46, and the seal lip portion 48 are formed of an elastic material, for example, an elastomer.

In this embodiment, the seal lip portion 48 has a cylindrical shape, but may have one or more seal lips that are similar in shape to any of seal lips of the seal lip portion 18.

The mounted part 42 includes an elastic ring 50 made of an elastic material, e.g., an elastomer, and a rigid ring 52 made of a rigid material, e.g., a metal, fixed around the elastic ring 50. The elastic ring 50 may be formed of the same material as that of the cylindrical part 44, the bellows part 46, and the seal lip portion 48, and in this case, the elastic ring 50 is connected to the bellows part 46.

The rigid ring 52 has a substantially L-shape in cross-section, and is fitted into the elastic ring 20 of the mounted part 12 of the sealing part 10.

The bellows part 46 a part that is easily elastically deformed, and is provided so as to allow the movement, i.e., the inclination and eccentricity of the rotational shaft 4 by means of the elastic deformation thereof, and to allow the seal lip portion 48 to be in contact with the outer peripheral surface of the rotational shaft 4 over the entire circumference.

Furthermore, the sealing part 40 includes an annular sliding member 54 that is disposed inside the cylindrical part 44 and is fixed to the cylindrical part 44. A convex portion formed on the outer peripheral surface of the sliding member 54 is engaged into a recess formed on the inner peripheral surface of the cylindrical part 44. The scheme for connecting the sliding member 54 to the cylindrical part 44 will be described in more detail later.

The sliding member 54 is provided so that the seal lip portion 48 can be in contact with the outer peripheral surface of the rotational shaft 4 over the entire circumference even when the rotational shaft 4 is inclined or eccentric relative to the shaft hole 2A. When the rotational shaft 4 is inclined or eccentric relative to shaft hole 2A, the sliding member 54 around the rotational shaft 4 is moved following the movement of the rotational shaft 4. Since the seal lip portion 48 is located in a stationary position relative to the sliding member 54, it is also located in a stationary position relative to the rotational shaft 4. Therefore, the seal lip portion 48 can be in contact with the outer peripheral surface of the rotational shaft 4 over the entire circumference.

Thus, when the rotational shaft 4 is rotated, the outer peripheral surface of the rotational shaft 4 slides on the inner peripheral surface of the sliding member 54. The sliding member 54 is made of a resin having a lower coefficient of friction, such as polytetrafluoroethylene that is harder than elastomers. Therefore, even when the rotational shaft 4 is rotated, abnormal noise, which may be caused by friction between the outer peripheral surface of the rotational shaft 4 and the inner peripheral surface of the sliding member 54, is prevented from being generated.

Although not necessary, grooves 54A for retaining grease are formed on the inner peripheral surface of the sliding member 54. The grease further reduces the friction between the outer peripheral surface of the rotational shaft 4 and the inner peripheral surface of the sliding member 54.

Although not provided in this embodiment, a reinforcing ring that is similar to the reinforcing ring 26 of the sealing part 10 may be embedded in the cylindrical part 44. Such a reinforcing ring reduces the deformation of the cylindrical part 44 so that the seal lip portion 48 can be in contact with the rotational shaft 4 in a stable orientation.

The connection of the sliding member 54 and the cylindrical part 44 will be described in more detail.

At one end of the cylindrical part 44 on the passenger compartment side, a projecting portion 60 that projects radially inward is formed. As enlarged in FIG. 2, the projecting portion 60 has two parallel surfaces perpendicular to the rotational shaft 4.

Figure 3:
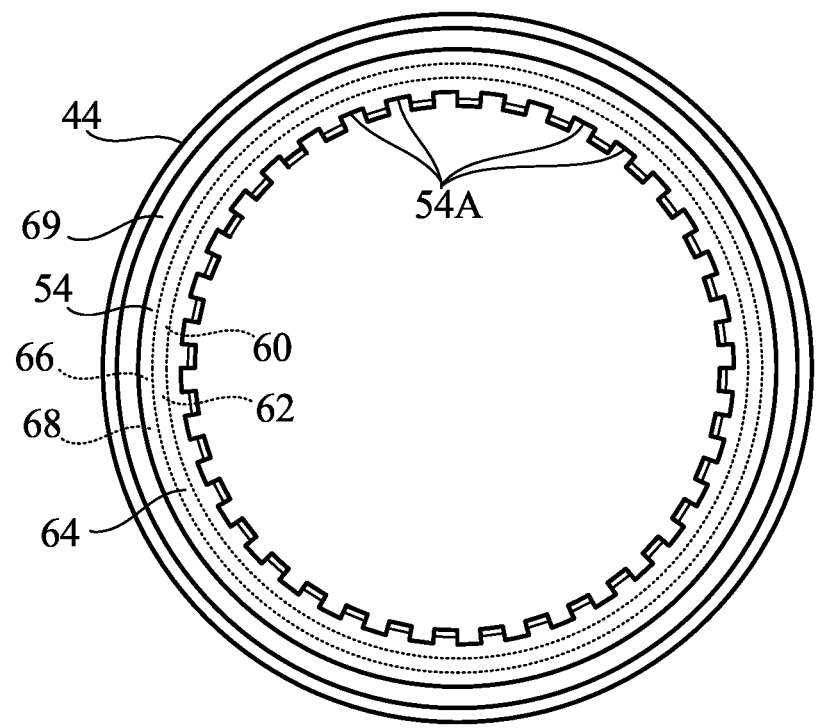
FIG. 3 is a bottom view of a part of the sealing device shown in FIG. 2.

FIG. 3 is a bottom view of the cylindrical part 44 and the sliding member 54, more specifically, viewed from the space P of the passenger compartment side. As shown in FIG. 3, in this embodiment, the projecting portion 60 is an annular projection extending continuously in a circumferential direction.

Figure 2:
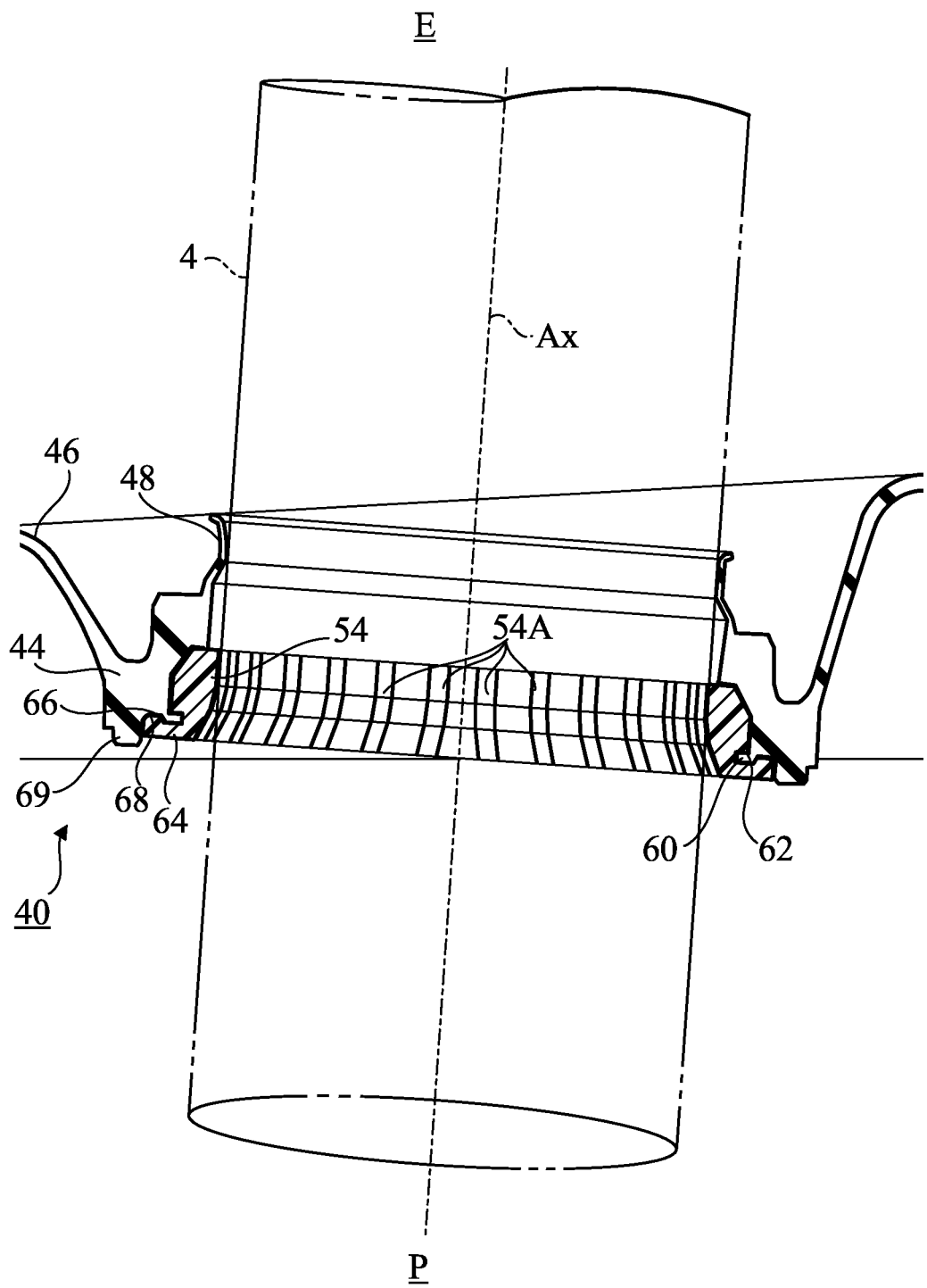
FIG. 2 is an enlarged cross-sectional view showing a part of the sealing device of FIG. 1 when the rotational shaft is inclined.

On the other hand, as enlarged in FIG. 2, a circumferential groove 62 is formed on the outer peripheral surface of the sliding member 54. The circumferential groove 62 has a cylindrical bottom peripheral surface and two side walls perpendicular to the bottom peripheral surface. The projecting portion 60 is fitted into the circumferential groove 62, with the two surfaces of the projecting portion 60 being in contact with the two side wall surfaces of the circumferential groove 62, respectively. Therefore, the sliding member 54 is securely connected with the cylindrical part 44, and the connection is stabilized. As a result, even if the rotational shaft 4 is eccentric relative to the housing 2 or inclined as shown in FIG. 2, the seal lip portion 48 continues to be in contact with the outer peripheral surface of the rotational shaft 4 over the entire circumference.

Furthermore, at the end of the sliding member 54, an extending portion 64 extending radially outward, and a hook portion 66 extending along the axial direction from the outer edge of the extending portion are formed. The extending portion 64 and the hook portion 66 are coaxial with the projecting portion 60 and the circumferential groove 62. As shown in FIG. 3, in this embodiment, the extending portion 64 is a flange extending continuously in a circumferential direction, and the hook portion 66 is a cylinder extending continuously in a circumferential direction. Therefore, the extending portion 64 is one side wall of the circumferential groove 62, and the hook portion 66 coincides with the circumferential groove 62 in radial directions.

On the other hand, as enlarged in FIG. 2, an end surface circumferential groove 68 and an annular convex wall 69 are formed on the end surface of the cylindrical part 44. The annular convex wall 69 is formed around the end surface circumferential groove 68, and is coaxial with the projecting portion 60 and the circumferential groove 62.

The end surface circumferential groove 68 is disposed radially outside the projecting portion 60 and coincides with the projecting portion 60 in radial directions. Thus, the hook portion 66 at the end of the sliding member 54 and the end surface circumferential groove 68 of the cylindrical part 44 are disposed radially outside the circumferential groove 62 of the sliding member 54 and the projecting portion 60 of the cylindrical part 44. The hook portion 66 at the end of the sliding member 54 is fitted into the end surface circumferential groove 68 of the cylindrical part 44. Therefore, the connection of the circumferential groove 62 of the sliding member 54 and the projecting portion 60 of the cylindrical part 44 is unlikely to be released. As a result, the sliding member 54 is further securely connected with the cylindrical part 44, and the connection is further stabilized.

Figure 4:
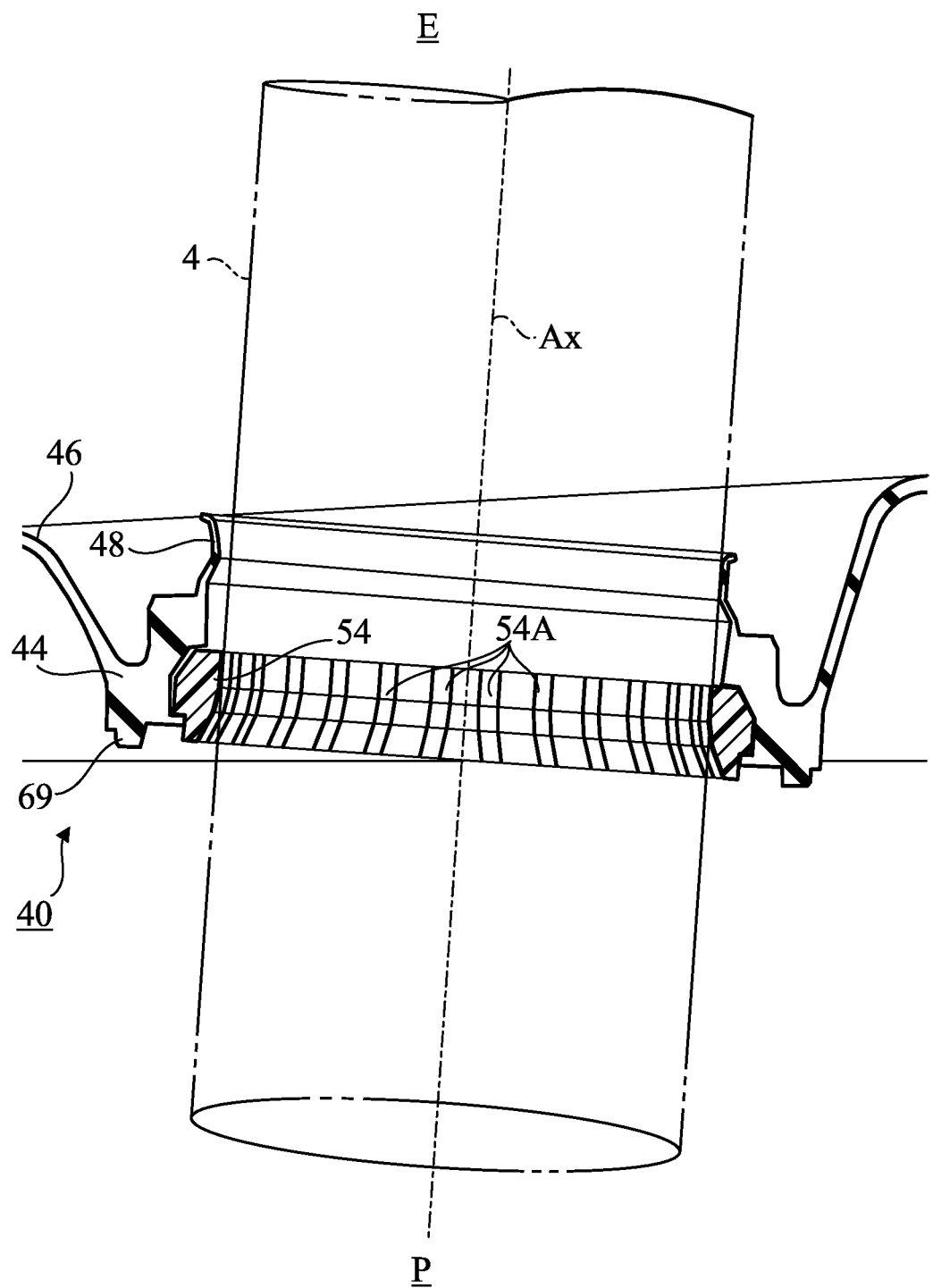
FIG. 4 is an enlarged cross-sectional view showing a part of the sealing device according to a comparative example when the rotational shaft is inclined.

FIG. 4 is an enlarged view of a part of another sealing part 40 according to a comparative example when the rotation shaft 4 is inclined. In this comparative example, the projecting portion 60 and the end surface circumferential groove 68 are not formed in the cylindrical part 44, and the circumferential groove 62, the extending portion 64, and the hook portion 66 are not formed in the sliding member 54. A convex portion formed on the outer peripheral surface of the sliding member 54 is simply fitted into a recess formed on the inner peripheral surface of the cylindrical part 44, so that the sliding member 54 is connected to the cylindrical part 44.

In the comparative example, the strength of the connection of the sliding member 54 and the cylindrical part 44 is insufficient, and on the left side in FIG. 4, the cylindrical part 44 is separated slightly from the sliding member 54. That is, on the left side in FIG. 4, the cylindrical part 44 is not firmly supported by the sliding member 54. Therefore, the seal lip portion 48 cannot follow the inclination of the rotational shaft 4, and is separated away from the rotational shaft 4. In contrast, in the embodiment, the cylindrical part 44 is firmly supported by the sliding member 54 over the entire circumference, and the seal lip portion 48 continues to be in contact with the outer peripheral surface of the rotational shaft 4 over the entire circumference.

Figure 5:
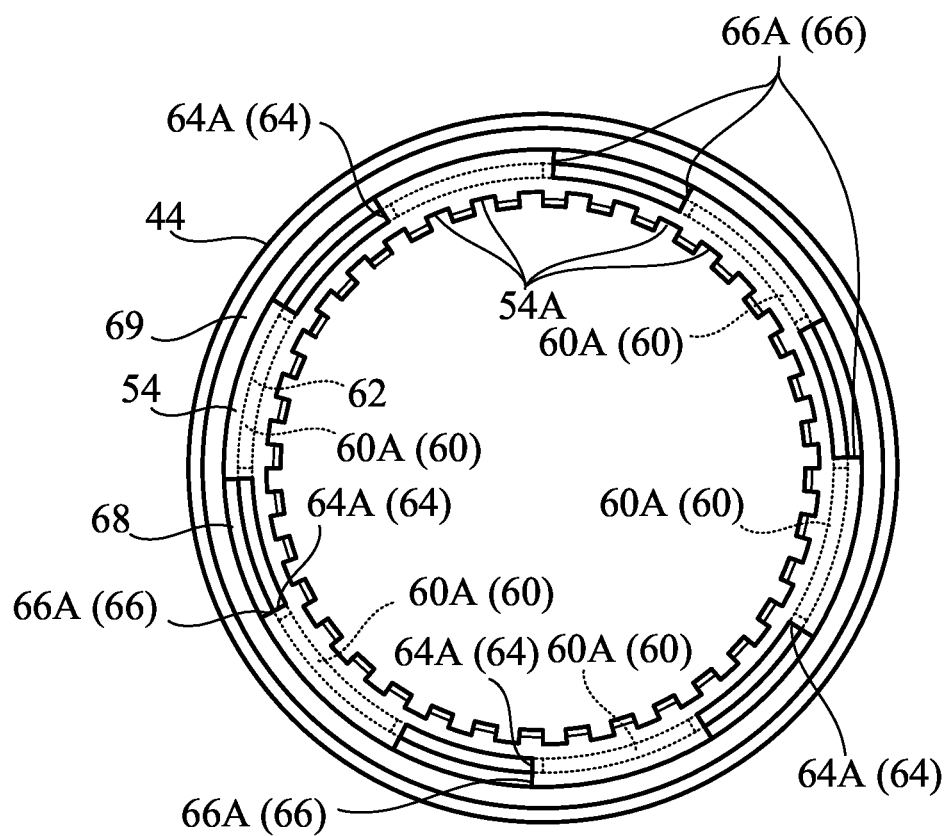
FIG. 5 is a bottom view of a part of a sealing device according to a modification of the first embodiment.

FIG. 5 is a bottom view of the cylindrical part 44 and the sliding member 54 of a sealing device 1 according to a modification of the first embodiment, more specifically, viewed from the space P of the passenger compartment side in the same manner as in FIG. 3.

In this modification, the projecting portion 60 projecting radially inward of the cylindrical part 44 is not an annular projection extending continuously in a circumferential direction. Rather, the projecting portion 60 includes a plurality of projections 60A spaced apart at intervals in a circumferential direction. The intervals of the projections 60A of the projecting portion are equal, but may not be equal. The number of the projections 60A of the projecting portion is not limited to the number shown in the drawing.

The projections 60A are fitted into the circumferential groove 62 formed on the outer peripheral surface of the sliding member 54, and two surfaces of each projection 60A perpendicular to the rotational shaft 4 are in contact with the two side wall surfaces of the circumferential groove 62, respectively, as shown in FIG. 2. In this modification and in the first embodiment, the cross-sectional view shown in FIG. 2 is common. However, in FIG. 2, the projecting portion 60 shall be read as projections 60A for this modification.

In this modification, the sliding member 54 is securely connected with the cylindrical part 44, and the connection is stabilized. As a result, even if the rotational shaft 4 is eccentric relative to the housing 2 or inclined as shown in FIG. 2, the seal lip portion 48 continues to be in contact with the outer peripheral surface of the rotational shaft 4 over the entire circumference.

In this modification, instead of an annular projection extending continuously in a circumferential direction, a plurality of projections 60A spaced apart at intervals in a circumferential direction are fitted into the circumferential groove 62 formed on the outer peripheral surface of the sliding member 54, so that the projecting portion 60 can be easily connected to the circumferential groove 62 as compared with the first embodiment.

Furthermore, in this modification, the extending portion 64 at the end portion of the sliding member 54 is not a flange extending continuously in a circumferential direction, and includes a plurality of protrusions 64A arranged at intervals in a circumferential direction, and the hook portion 66 is not a cylinder extending continuously in a circumferential direction, and includes a plurality of segments 66A arranged at intervals in a circumferential direction. The intervals of the protrusions 64A of the extending portion are equal, but may not be equal. The number of the protrusions 64A of the extending portion is not limited to the number shown in the drawing. The intervals of the segments 66A of the hook portion are equal, but may not be equal. The number of the segments 66A of the hook portion is not limited to the number shown in the drawing.

In FIG. 2, the extending portion 64 shall be read as protrusions 64A, and the hook portion 66 shall be read as segments 66A for this modification. The protrusions 64A of the extending portion constitutes one side wall of the circumferential groove 62, the segments 66A of the hook portion coincide with the circumferential groove 62 in radial directions. The segments 66A of the hook portion at the end of the sliding member 54 are fitted into the end surface circumferential groove 68 of the cylindrical part 44. Therefore, the connection of the circumferential groove 62 of the sliding member 54 and the projecting portion 60 of the cylindrical part 44 is unlikely to be released. As a result, the sliding member 54 is further securely connected with the cylindrical part 44, and the connection is further stabilized.

In this modification, instead of a cylinder extending continuously in a circumferential direction, a plurality of segments 66A spaced apart at intervals in a circumferential direction are fitted into the end surface circumferential groove 68 of the cylindrical part 44, so that the hook portion 66 can be easily connected to the end surface circumferential groove 68 as compared with the first embodiment.

In this modification, the projecting portion 60 includes a plurality of projections 60A, the extending portion 64 includes a plurality of protrusions 64A, and the hooking portion 66 includes a plurality of segments 66A. However, any one or two of the projecting portion 60, the extending portion 64, and the hooking portion 66 may extend continuously in circumferential directions.

Second Embodiment

Figure 6:
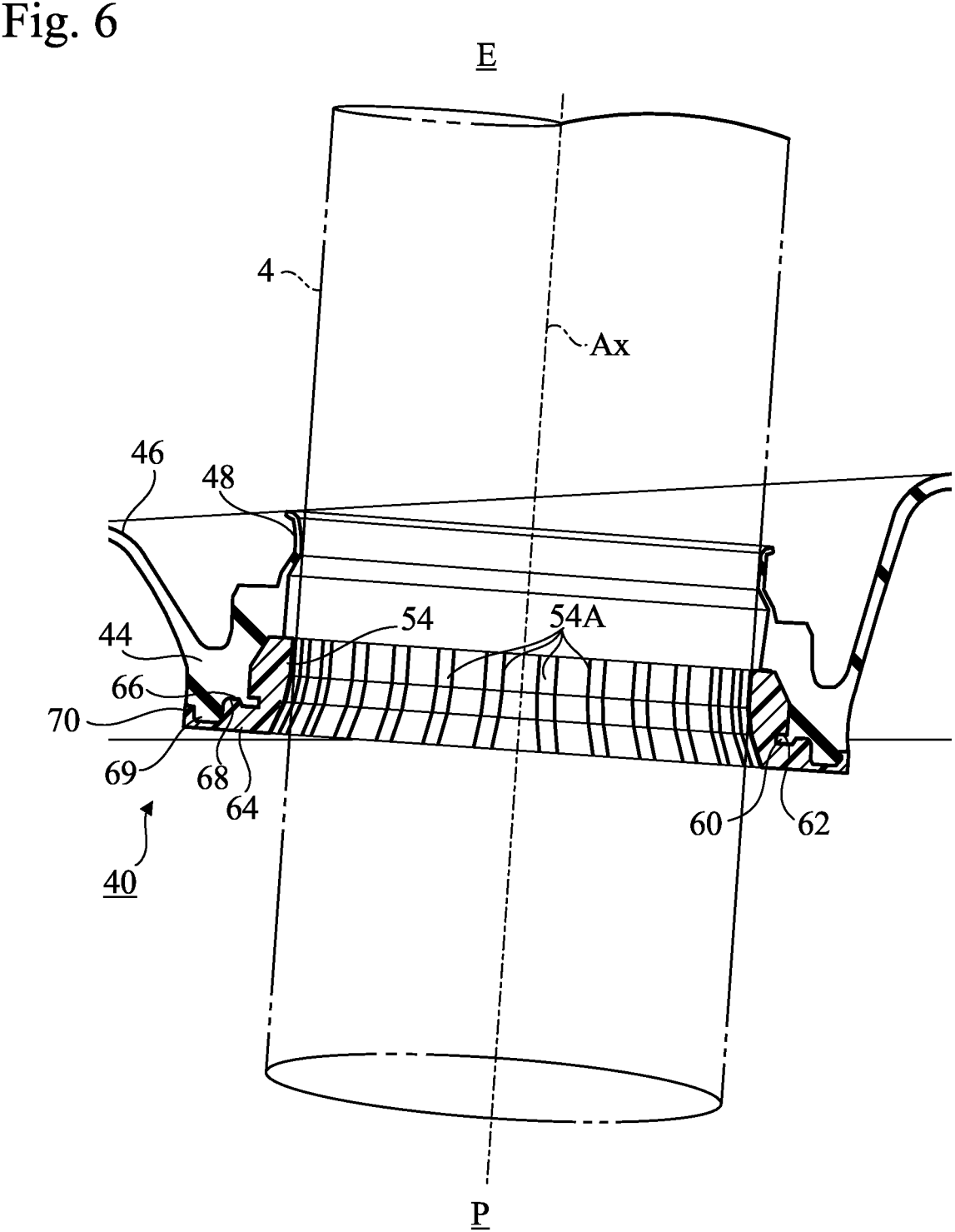
FIG. 6 is an enlarged cross-sectional view showing a part of a sealing device according to a second embodiment when the rotational shaft is inclined.

FIG. 6 is an enlarged cross-sectional view showing a sealing part 40 of the sealing device according to a second embodiment when the rotation shaft 4 is inclined. In FIG. 6 and the subsequent drawings, the same reference symbols are used to identify components already described, and these components will not be described in detail.

In the second embodiment, the extending portion 64 formed at the end of the sliding member 54, which extends radially outward, is larger than the extending portion 64 in the first embodiment, and is in contact with the annular convex wall 69 of the end surface of the cylindrical part 44.

The sliding member 54 further includes an outer hook portion 70. The outer hook portion 70 extends along the axial direction from the outer edge of the extending portion 64, and is disposed radially outside the hook portion 66 and coaxially with the hook portion 66. The outer hook portion 70 is in contact with the outer peripheral surface of the annular convex wall 69 of the cylindrical part 44.

The sealing part 40 according to the second embodiment has features of the sealing part 40 according to the first embodiment, and can achieve the same effects related to the first embodiment.

Furthermore, according to the second embodiment, the outer hook portion 70 formed at the end of the sliding member 54 is in contact with the outer peripheral surface of the cylindrical part 44, in addition to fitting the projecting portion 60 formed at the inside of the cylindrical part 44 into the circumferential groove 62 of the outer peripheral surface of the sliding member 54. In other words, the inner peripheral surface of the cylindrical part 44 is in contact with the outer peripheral surface of the sliding member 54, and the outer peripheral surface of the cylindrical part 44 is in contact with the outer hook portion 70 of the sliding member 54, so that the end of the cylindrical part 44 is fitted into the end of the sliding member 54. As a result, the sliding member 54 is further securely connected with the cylindrical part 44, and the connection is further stabilized.

Figure 7:
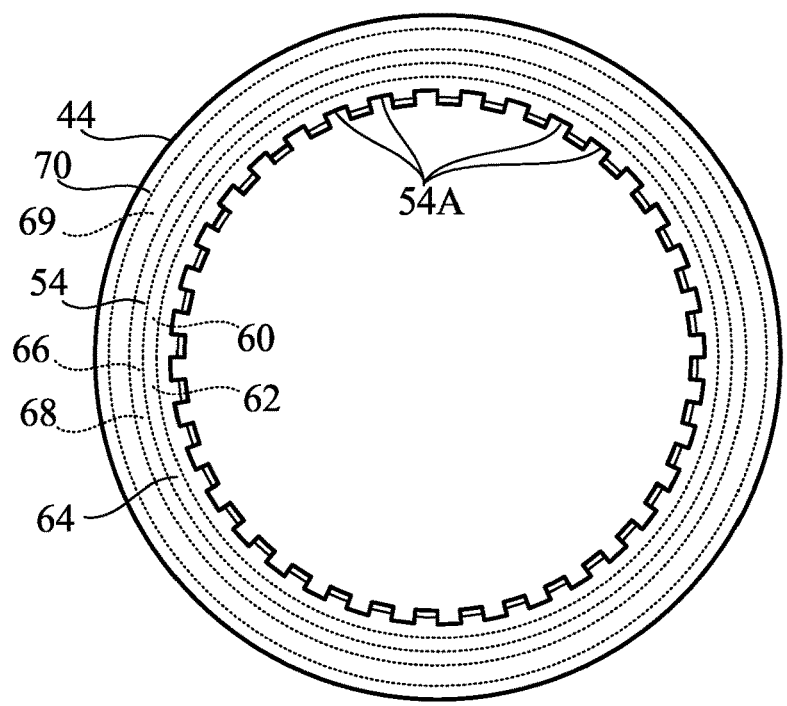
FIG. 7 is a bottom view of a part of the sealing device shown in FIG. 6.

FIG. 7 is a bottom view of the cylindrical part 44 and the sliding member 54 in the second embodiment, more specifically, viewed from the space P of the passenger compartment side. As shown in FIG. 7, in this embodiment, the projecting portion 60 is an annular projection extending continuously in a circumferential direction, the extending portion 64 is a flange extending continuously in a circumferential direction, and the hook portion 66 is a cylinder extending continuously in a circumferential direction. In addition, the outer hook portion 70 is a cylinder extending continuously in a circumferential direction.

Figure 8:
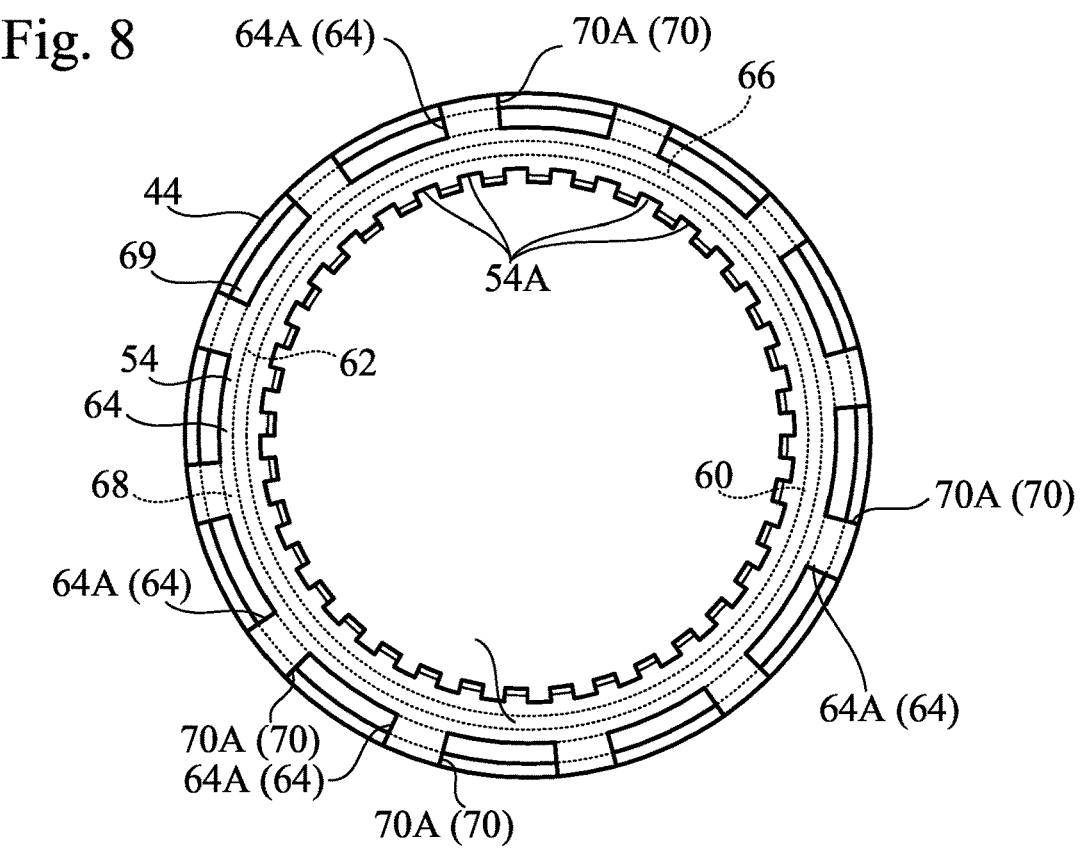
FIG. 8 is a bottom view of a part of a sealing device of a modification of the second embodiment.

However, as shown in FIG. 8, the extending portion 64 may include a plurality of protrusions 64A on the radial outside thereof, which are arranged at intervals in a circumferential direction, and the outer hook portion 70 may include a plurality of segments 70A arranged at intervals in a circumferential direction. The intervals of the segments 70A of the outer hook portion are equal, but may not be equal. The number of the segments 70A of the outer hook portion is not limited to the number shown in the drawing. In the modification of FIG. 8, instead of a cylinder extending continuously in a circumferential direction, a plurality of segments 70A arranged at spaced intervals in a circumferential direction are disposed outside the cylindrical part 44, so that the outer hook portion 70 can be easily connected to the cylindrical part 44 as compared with the first embodiment.

Also in the second embodiment, the projecting portion 60 may include a plurality of projections 60A. The hooking portion 66 may include a plurality of segments 66A.

Third Embodiment

Figure 9:
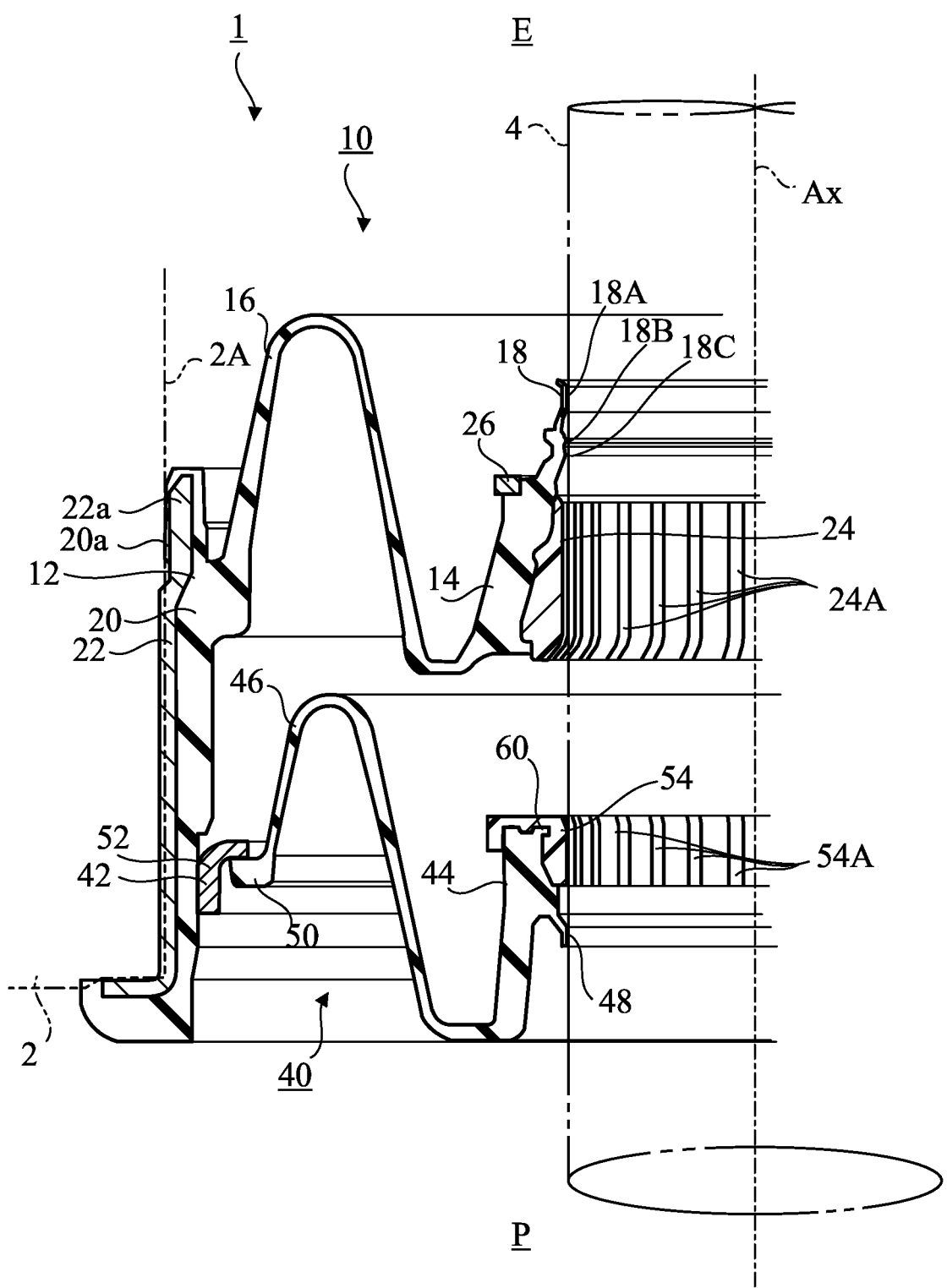
FIG. 9 is a cross-sectional view showing a sealing device according to a third embodiment of the present invention.

FIG. 9 shows a sealing device 1 according to a third embodiment of the present invention. In the sealing device 1, the position and the shape of the mounted part 12 of the sealing part 10 are different from those of the mounted part 12 of the sealing part 10 in the first embodiment. The position and the shape of the mounted part 42 of the sealing part 40 are also different from those of the mounted part 42 of the sealing part 40 in the first embodiment.

Furthermore, the orientations of the seal lip portion 48 and the sliding member 54 relative to the cylindrical part 44 are opposite to the orientations of the seal lip portion 48 and the sliding member 54 relative to the cylindrical part 44 in the first embodiment. That is, the seal lip portion 48 extends from the cylindrical part 44 radially inward and toward the space P on the passenger compartment side, and the sliding member 54 is disposed in a recess formed in the inner peripheral surface of the end of the cylindrical part 44 on the engine compartment side.

Figure 10:
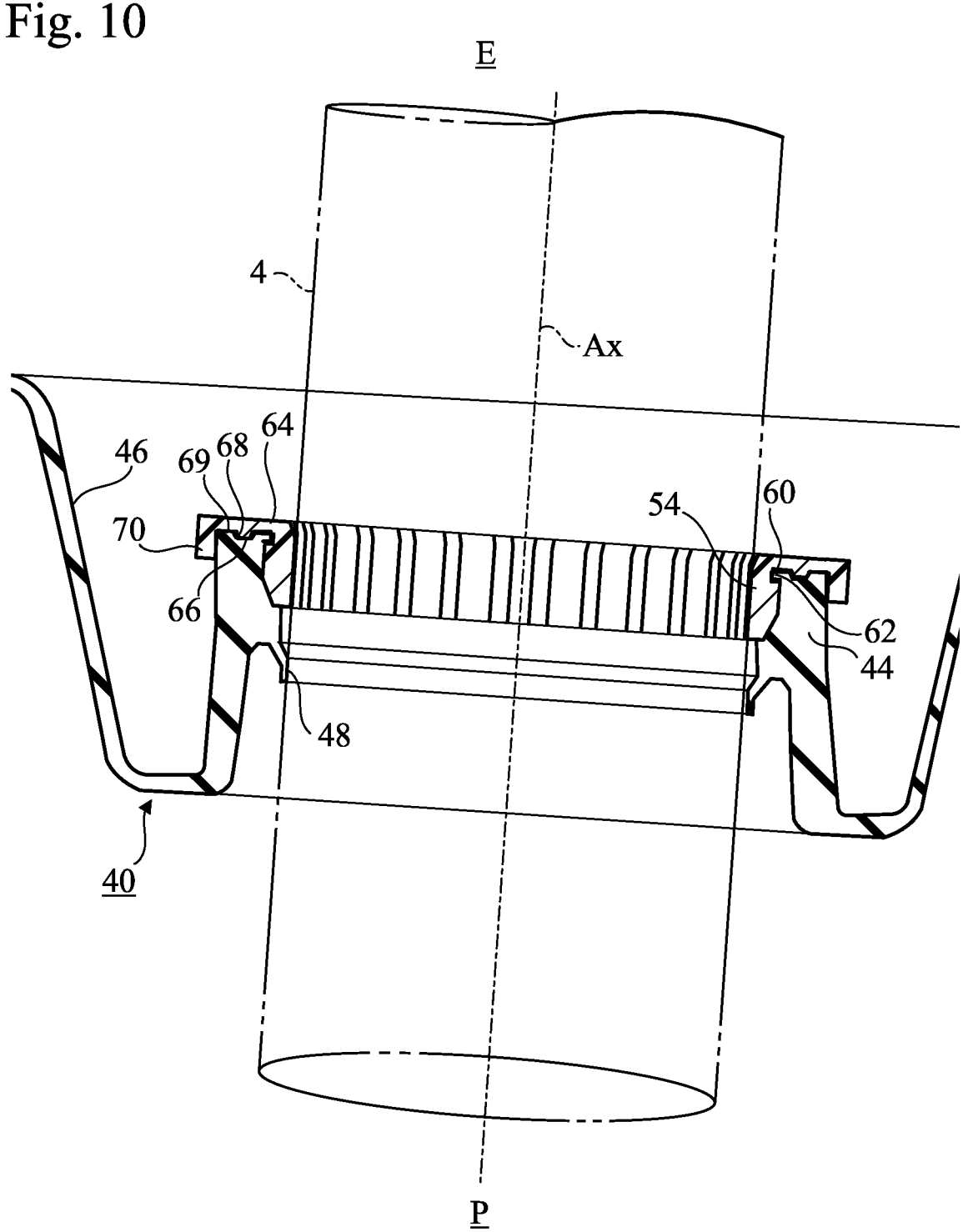
FIG. 10 is an enlarged cross-sectional view showing a part of the sealing device shown in FIG. 9 when the rotational shaft is inclined.

As shown in FIG. 10, in this embodiment, the projecting portion 60 and the end surface circumferential groove 68 are formed at the end of the cylindrical part 44 on the engine compartment side, and the circumferential groove 62, the extending portion 64, the hook portion 66, and the annular convex wall 69 are formed at the end of the sliding member 54 on the engine compartment side. That is, this embodiment differs from the second embodiment in that these components are provided on the engine compartment side of the cylindrical part 44 and the sliding member 54 in this embodiment, whereas these components are provided on the passenger compartment side of the cylindrical part 44 and the sliding member 54. Description of these components and the modifications in the second embodiment also applies to the third embodiment.

Other Modifications

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

For example, in the above embodiments, although the reliability of the connection of the cylindrical part 44 and the sliding member 54 is improved in the sealing part 40, similar components in the sealing part 40 may be provided in the other sealing part 10 to improve the reliability of the connection of the cylindrical part 14 and the sliding member 24.

The sliding members 24 and/or 54 may be reinforced with rigid rings.

A known sound insulation ring disclosed in JP-A-2019-7552 may be provided around the rotation shaft 4. The sound insulation ring may be disposed, for example, between the sealing part 10 and the sealing part 40.

Aspects of the present invention are also set out in the following numbered clauses:

Clause 1. A sealing device for sealing a clearance between a housing and a rotational shaft disposed in a housing, the sealing device including:
  an annular mounted part being to be mounted to an inner peripheral surface of the shaft hole:
  a cylindrical part disposed radially inside the mounted part;
  a seal lip portion extending from the cylindrical part and being to be in contact with an outer peripheral surface of the rotational shaft;
  a bellows part connecting the mounted part to the cylindrical part; and
  an annular sliding member made of a resin and disposed radially inside the cylindrical part, the outer peripheral surface of the rotational shaft being to slide on the annular sliding member,
  the cylindrical part, the seal lip portion, and the bellows part being made of an elastic material having an elasticity that is higher than that of the resin,
  the cylindrical part including a projecting portion projecting radially inward, the projecting portion being an annular projection extending continuously in a circumferential direction, or including a plurality of projections arranged at intervals in a circumferential direction, the projecting portion including two surfaces perpendicular to the rotational shaft,
  a circumferential groove being formed on an outer peripheral surface of the sliding member, the circumferential groove including a cylindrical bottom peripheral surface and two side walls perpendicular to the bottom peripheral surface,
  the projecting portion being fitted into the circumferential groove, the two surfaces of the projecting portion being in contact with the two side wall surfaces of the circumferential groove, respectively.

Clause 2. The sealing device according to clause 1, wherein an extending portion and a hook portion are formed at an end of the sliding member, the extending portion extending radially outward, the hook portion extending along an axial direction from the extending portion, the extending portion being a flange extending continuously in a circumferential direction, or including a plurality of protrusions arranged at intervals in a circumferential direction, the hook portion being a cylinder extending continuously in a circumferential direction, or including a plurality of segments arranged at intervals in a circumferential direction, the hook portion coinciding with the circumferential groove in radial directions, the projecting portion being formed at an end of the cylindrical part, an end surface circumferential groove being formed on an end surface of the cylindrical part and located radially outside the projecting portion, and coinciding with the projecting portion in radial directions, the hook portion of the sliding member being fitted into the end surface circumferential groove.

According to this clause, the hook portion at the end of the sliding member and the end surface circumferential groove of the cylindrical part are disposed radially outside the circumferential groove of the sliding member and the projecting portion of the cylindrical part, and the hook portion at the end of the sliding member is fitted into the end surface circumferential groove of the cylindrical part. Therefore, the connection of the circumferential groove of the sliding member and the projecting portion of the cylindrical part is unlikely to be released. As a result, the sliding member is further securely connected with the cylindrical part, and the connection is further stabilized.

Clause 3. The sealing device according to clause 1 or 2, wherein an extending portion and an outer hook portion are formed at an end of the sliding member, the extending portion extending radially outward and being in contact with an end surface of the cylindrical part, the outer hook portion extending along an axial direction from the extending portion, the extending portion being a flange extending continuously in a circumferential direction, or including a plurality of protrusions arranged at intervals in a circumferential direction, the outer hook portion being a cylinder extending continuously in a circumferential direction, or including a plurality of segments arranged at intervals in a circumferential direction, the outer hook portion being in contact with an outer peripheral surface of the cylindrical part.

According to this clauses, the outer hook portion formed at the end of the sliding member is in contact with the outer peripheral surface of the cylindrical part, in addition to fitting the projecting portion formed at the inside of the cylindrical part into the circumferential groove of the outer peripheral surface of the sliding member. In other words, the inner peripheral surface of the cylindrical part is in contact with the outer peripheral surface of the sliding member, and the outer peripheral surface of the cylindrical part is in contact with the outer hook portion of the sliding member, so that the end of the cylindrical part is fitted into the end of the sliding member. As a result, the sliding member is further securely connected with the cylindrical part, and the connection is further stabilized.

REFERENCE SYMBOLS

1: Sealing device
2: Housing (front dash panel)
2A: Shaft hole
4: Rotational shaft (steering shaft)
10, 40: Sealing part
42: Mounted part
44: Cylindrical part
46: Bellows part
48: Seal lip portion
50: Elastic ring
52: Rigid ring
54: Sliding member
60: Projecting portion
60A: Projection of projecting portion
62: Circumferential groove
64: Extending portion
64A: Protrusion of extending portion
66: Hook portion
66A: Segment of hook portion
68: End surface circumferential groove
69: Annular convex wall
70: Outer hook portion
70A: Segment of outer hook portion

The invention claimed is:

1. A sealing device for sealing a clearance between a housing and a rotational shaft disposed in a shaft hole formed in the housing, the sealing device comprising:

an annular mounted part being to be mounted to an inner peripheral surface of the shaft hole;

a cylindrical part disposed radially inside the annular mounted part;

a seal lip portion extending from the cylindrical part and being to be in contact with an outer peripheral surface of the rotational shaft;

a bellows part connecting the annular mounted part to the cylindrical part; and an annular sliding member made of a resin and disposed radially inside the cylindrical part, the outer peripheral surface of the rotational shaft being to slide on the annular sliding member, the annular sliding member having a first axial end and a second axial end, the cylindrical part, the seal lip portion, and the bellows part being made of an elastomer having an elasticity that is higher than that of the resin, the cylindrical part comprising a projecting portion projecting radially inward, the projecting portion being an annular projection extending continuously in a circumferential direction, or comprising a plurality of projections arranged at intervals in a circumferential direction, the projecting portion having two surfaces perpendicular to the rotational shaft, the annual sliding member having a circumferential groove formed on an outer peripheral surface of the annular sliding member, the circumferential groove having a cylindrical bottom peripheral surface and two side walls perpendicular to the bottom peripheral surface, the projecting portion being fitted into the circumferential groove, the two surfaces of the projecting portion being in contact with the two side wall surfaces of the circumferential groove, respectively, wherein the annular sliding member comprises an extending portion and a hook portion that are formed at the first axial end of the annular sliding member, the extending portion extending radially outward from the first axial end, the extending portion being a flange extending continuously in a circumferential direction, or comprising a plurality of protrusions arranged at intervals in a circumferential direction, the hook portion being a cylinder extending continuously in a circumferential direction, or comprising a plurality of hook segments arranged at intervals in a circumferential direction, the hook portion extending along an axial direction from the extending portion toward the second axial end and surrounding the circumferential groove, the projecting portion being formed at an end of the cylindrical part, the cylindrical part having an end surface circumferential groove formed on an end surface of the cylindrical part and located radially outside the projecting portion, the end surface circumferential groove surrounding the projecting portion, the hook portion of the annular sliding member being fitted into the end surface circumferential groove.

2. A sealing device for sealing a clearance between a housing and a rotational shaft disposed in a shaft hole formed in the housing, the sealing device comprising:

an annular mounted part being to be mounted to an inner peripheral surface of the shaft hole;

a cylindrical part disposed radially inside the annular mounted part;

a seal lip portion extending from the cylindrical part and being to be in contact with an outer peripheral surface of the rotational shaft;

a bellows part connecting the annular mounted part to the cylindrical part; and an annular sliding member made of a resin and disposed radially inside the cylindrical part, the outer peripheral surface of the rotational shaft being to slide on the annular sliding member, the annular sliding member having a first axial end and a second axial end, the cylindrical part, the seal lip portion, and the bellows part being made of an elastomer having an elasticity that is higher than that of the resin, the cylindrical part comprising a projecting portion projecting radially inward, the projecting portion being an annular projection extending continuously in a circumferential direction, or comprising a plurality of projections arranged at intervals in a circumferential direction, the projecting portion having two surfaces perpendicular to the rotational shaft, the annual sliding member having a circumferential groove formed on an outer peripheral surface of the annular sliding member, the circumferential groove having a cylindrical bottom peripheral surface and two side walls perpendicular to the bottom peripheral surface, the projecting portion being fitted into the circumferential groove, the two surfaces of the projecting portion being in contact with the two side wall surfaces of the circumferential groove, respectively, wherein the annular sliding member comprises an extending portion and an outer hook portion that are formed at the first axial end of the annular sliding member, the extending portion extending radially outward from the first axial end and being in contact with an end surface of the cylindrical part, the extending portion being a flange extending continuously in a circumferential direction, or comprising a plurality of protrusions arranged at intervals in a circumferential direction, the outer hook portion being a cylinder extending continuously in a circumferential direction, or comprising a plurality of outer hook segments arranged at intervals in a circumferential direction, the outer hook portion extending along an axial direction from the extending portion toward the second axial end and surrounding the cylindrical part, the outer hook portion being in contact with an outer peripheral surface of the cylindrical part.

3. The sealing device according to claim 2, wherein projecting portion comprises a plurality of projections arranged at intervals in a circumferential direction, each of the projections having two surfaces perpendicular to the rotational shaft that are in contact with the two side wall surfaces of the circumferential groove, respectively.

4. The sealing device according to claim 2, wherein the extending portion comprises a plurality of protrusions arranged at intervals in a circumferential direction, and wherein the outer hook portion comprises a plurality of outer hook segments arranged at intervals in a circumferential direction, the outer hook segments extending along the axial direction from the respective protrusions toward the second axial end and surrounding the cylindrical part, the outer hook segments being in contact with an outer peripheral surface of the cylindrical part.

5. The sealing device according to claim 2, wherein projecting portion comprises a plurality of projections arranged at intervals in a circumferential direction, each of the projections having two surfaces perpendicular to the rotational shaft that are in contact with the two side wall surfaces of the circumferential groove, respectively, wherein the extending portion comprises a plurality of protrusions arranged at intervals in a circumferential direction, and wherein the outer hook portion comprises a plurality of outer hook segments arranged at intervals in a circumferential direction, the outer hook segments extending along the axial direction from the respective protrusions toward the second axial end and surrounding the cylindrical part, the outer hook segments being in contact with an outer peripheral surface of the cylindrical part.

6. The sealing device according to claim 1, wherein the annular sliding member further comprises an outer hook portion formed at the first axial end of the annular sliding member, the extending portion being in contact with an end surface of the cylindrical part, the outer hook portion being a cylinder extending continuously in a circumferential direction, or comprising a plurality of outer hook segments arranged at intervals in a circumferential direction, the outer hook portion extending along an axial direction from the extending portion toward the second axial end and surrounding the cylindrical part, the outer hook portion being in contact with an outer peripheral surface of the cylindrical part.

7. The sealing device according to claim 6, wherein the projecting portion comprises a plurality of projections arranged at intervals in a circumferential direction, each of the projections having two surfaces perpendicular to the rotational shaft that are in contact with the two side wall surfaces of the circumferential groove, respectively.

8. The sealing device according to claim 6, wherein the extending portion comprises a plurality of protrusions arranged at intervals in a circumferential direction, wherein the hook portion comprises a plurality of hook segments arranged at intervals in a circumferential direction, the hook segments extending along the axial direction from the respective protrusions toward the second axial end and surrounding the circumferential groove, the hook segments being fitted into the end surface circumferential groove, and wherein the outer hook portion comprises a plurality of outer hook segments arranged at intervals in a circumferential direction, the outer hook segments extending along the axial direction from the respective protrusions toward the second axial end and surrounding the cylindrical part, the outer hook segments being in contact with an outer peripheral surface of the cylindrical part.

9. The sealing device according to claim 6, wherein the extending portion comprises a plurality of protrusions arranged at intervals in a circumferential direction, each of the projections having two surfaces perpendicular to the rotational shaft that are in contact with the two side wall surfaces of the circumferential groove, respectively, wherein the extending portion comprises a plurality of protrusions arranged at intervals in a circumferential direction, wherein the hook portion comprises a plurality of hook segments arranged at intervals in a circumferential direction, the hook segments extending along the axial direction from the respective protrusions toward the second axial end and surrounding the circumferential groove, the hook segments being fitted into the end surface circumferential groove, and wherein the outer hook portion comprises a plurality of outer hook segments arranged at intervals in a circumferential direction, the outer hook segments extending along the axial direction from the respective protrusions toward the second axial end and surrounding the cylindrical part, the outer hook segments being in contact with an outer peripheral surface of the cylindrical part.

10. The sealing device according to claim 1, wherein the projecting portion comprises a plurality of projections arranged at intervals in a circumferential direction, each of the projections having two surfaces perpendicular to the rotational shaft that are in contact with the two side wall surfaces of the circumferential groove, respectively.

11. The sealing device according to claim 1, wherein the extending portion comprises a plurality of protrusions arranged at intervals in a circumferential direction, and wherein the hook portion comprises a plurality of hook segments arranged at intervals in a circumferential direction, the hook segments extending along the axial direction from the respective protrusions toward the second axial end and surrounding the circumferential groove, the hook segments being fitted into the end surface circumferential groove.

12. The sealing device according to claim 1, wherein the projecting portion comprises a plurality of projections arranged at intervals in a circumferential direction, each of the projections having two surfaces perpendicular to the rotational shaft that are in contact with the two side wall surfaces of the circumferential groove, respectively, wherein the extending portion comprises a plurality of protrusions arranged at intervals in a circumferential direction, and wherein the hook portion comprises a plurality of hook segments arranged at intervals in a circumferential direction, the hook segments extending along the axial direction from the respective protrusions toward the second axial end and surrounding the circumferential groove, the hook segments being fitted into the end surface circumferential groove.

13. A sealing device for sealing a clearance between a housing and a rotational shaft disposed in a shaft hole formed in the housing, the sealing device comprising:

an annular mounted part being to be mounted to an inner peripheral surface of the shaft hole;

a cylindrical part disposed radially inside the annular mounted part;

a seal lip portion extending from the cylindrical part and being to be in contact with an outer peripheral surface of the rotational shaft;

a bellows part connecting the annular mounted part to the cylindrical part; and an annular sliding member made of a resin and disposed radially inside the cylindrical part, the outer peripheral surface of the rotational shaft being to slide on the annular sliding member, the annular sliding member having a first axial end and a second axial end, the cylindrical part, the seal lip portion, and the bellows part being made of an elastomer having an elasticity that is higher than that of the resin, the cylindrical part comprising a projecting portion projecting radially inward, the projecting portion comprising a plurality of projections arranged at intervals in a circumferential direction, each of the projections comprising two surfaces perpendicular to the rotational shaft, the annual sliding member having a circumferential groove formed on an outer peripheral surface of the annular sliding member, the circumferential groove having a cylindrical bottom peripheral surface and two side walls perpendicular to the bottom peripheral surface, the projections being fitted into the circumferential groove, the two surfaces of each of the projections being in contact with the two side wall surfaces of the circumferential groove, respectively, wherein the annular sliding member comprises a radially outward extending portion and an axially extending hook that are formed at the first axial end of the annular sliding member.

* * * * *